United States Patent [19]

Smith

[11] Patent Number: 4,896,736

[45] Date of Patent: Jan. 30, 1990

[54] FIREWALL MOUNTED FOOT VALVE AND BRAKE PEDAL ASSEMBLY

[75] Inventor: Jason Smith, Newark, Calif.

[73] Assignee: Paccar Inc., Bellevue, Wash.

[21] Appl. No.: 245,140

[22] Filed: Sep. 15, 1988

[51] Int. Cl.<sup>4</sup> .............................................. B62D 33/06
[52] U.S. Cl. .................................. 180/89.16; 74/512; 180/89.19
[58] Field of Search ............... 180/89.16, 89.17, 89.19; 74/512

[56] References Cited

U.S. PATENT DOCUMENTS

| | | | |
|---|---|---|---|
| 2,699,223 | 1/1955 | Brumbaugh | 180/89.17 |
| 3,766,802 | 10/1973 | Shellhause | 74/512 |
| 4,672,860 | 6/1987 | Parker | 74/512 |

OTHER PUBLICATIONS

Bendix Service Parts Catalog, pp. 03-I-1 to 03-I-4, E-7 Dual Brake Valve, Jan. 1980.
Freight Liner Brochure, 1988.
White Brochure, Undated.
Diamond Red Royale Brochure, Undated.
Ford Cargo Brochure, Feb. 1987.

*Primary Examiner*—Kenneth R. Rice
*Attorney, Agent, or Firm*—Flehr, Hohbach, Test, Albritton & Herbert

[57] ABSTRACT

A foot valve and brake pedal assembly for use in a truck of the cab-over-engine (COE) type is disclosed herein. The truck itself includes a cab located over the truck's engine and having a front windshield and a front vertical firewall located below the windshield and defining a forwardmost extend of the cab's entire near the driver's feet. The cab also includes a nose hood mounted for pivotal movement between a closed position in front of the firewall and an opened position for gaining access to the firewall externally of the cab. The foot valve and brake pedal assembly is mounted to the firewall in a way which allows it to be removed as an assembled unit from outside the cab when the nose hood is in its opened position.

6 Claims, 5 Drawing Sheets

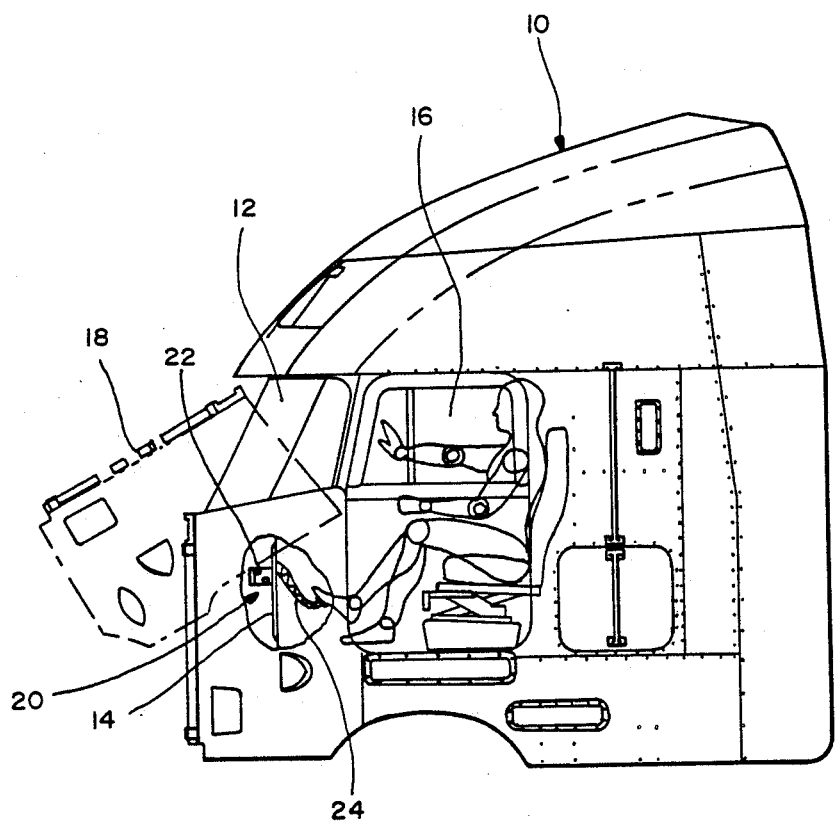
FIG.—1

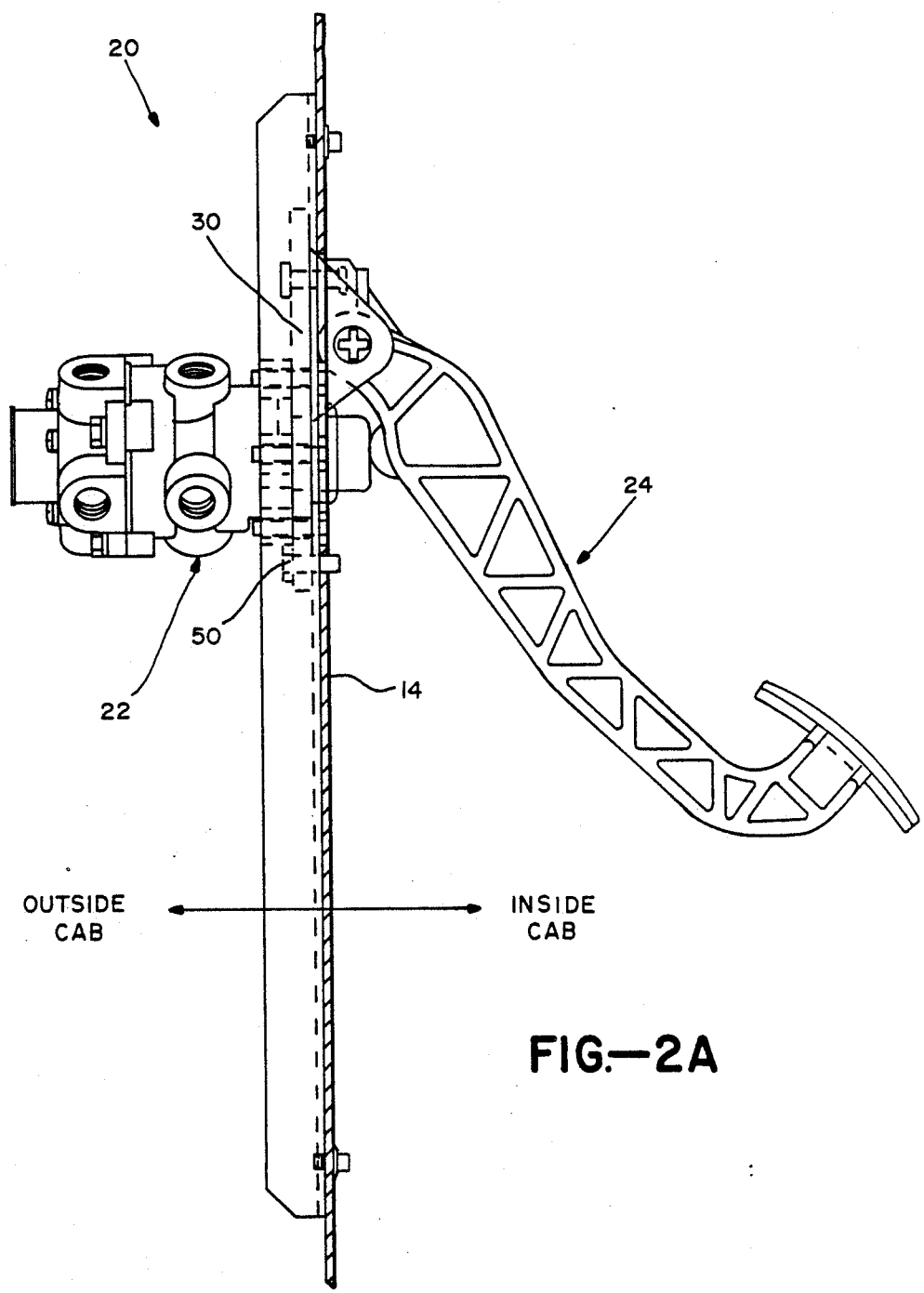
FIG.—2A

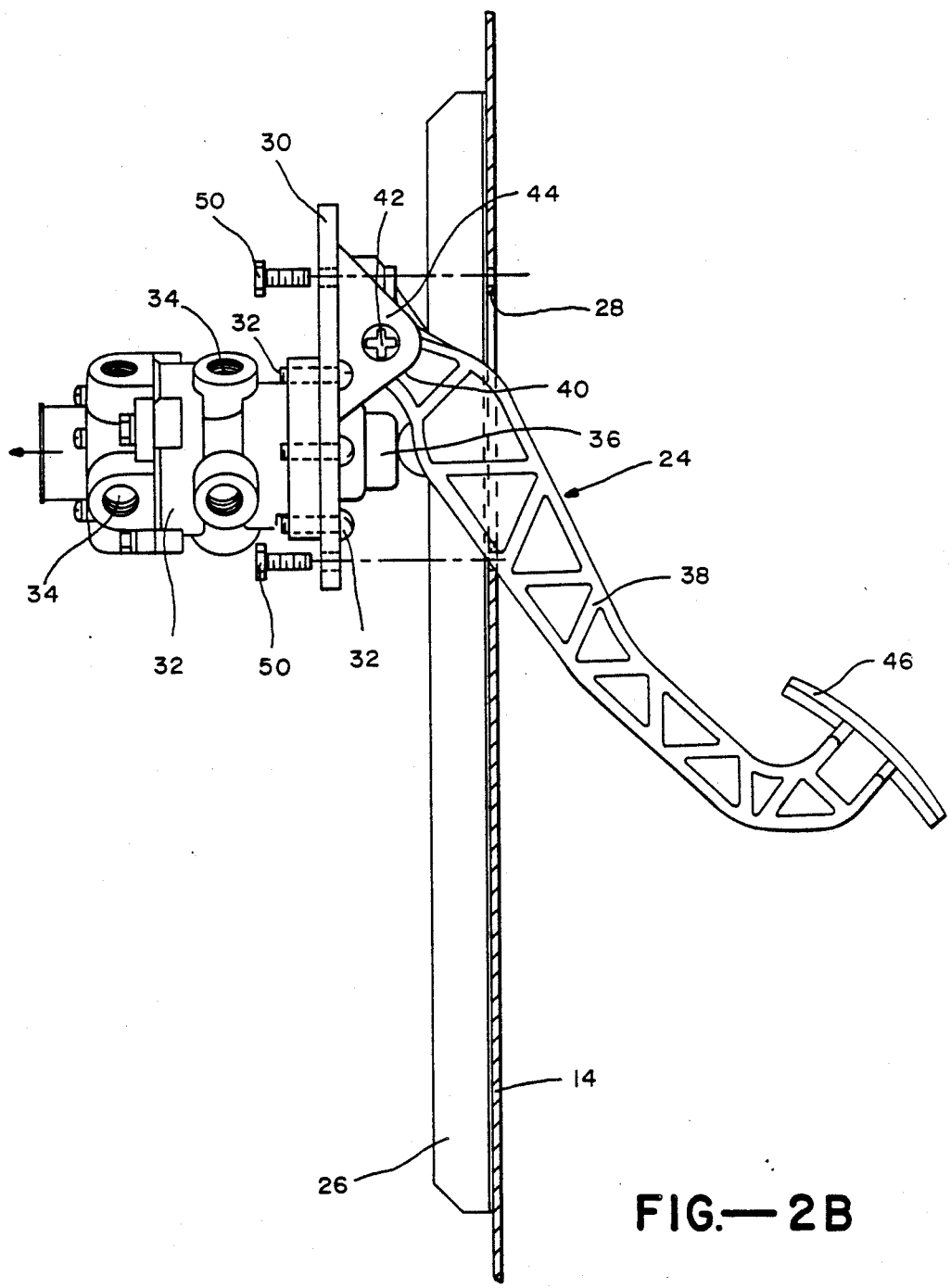
FIG.—2B

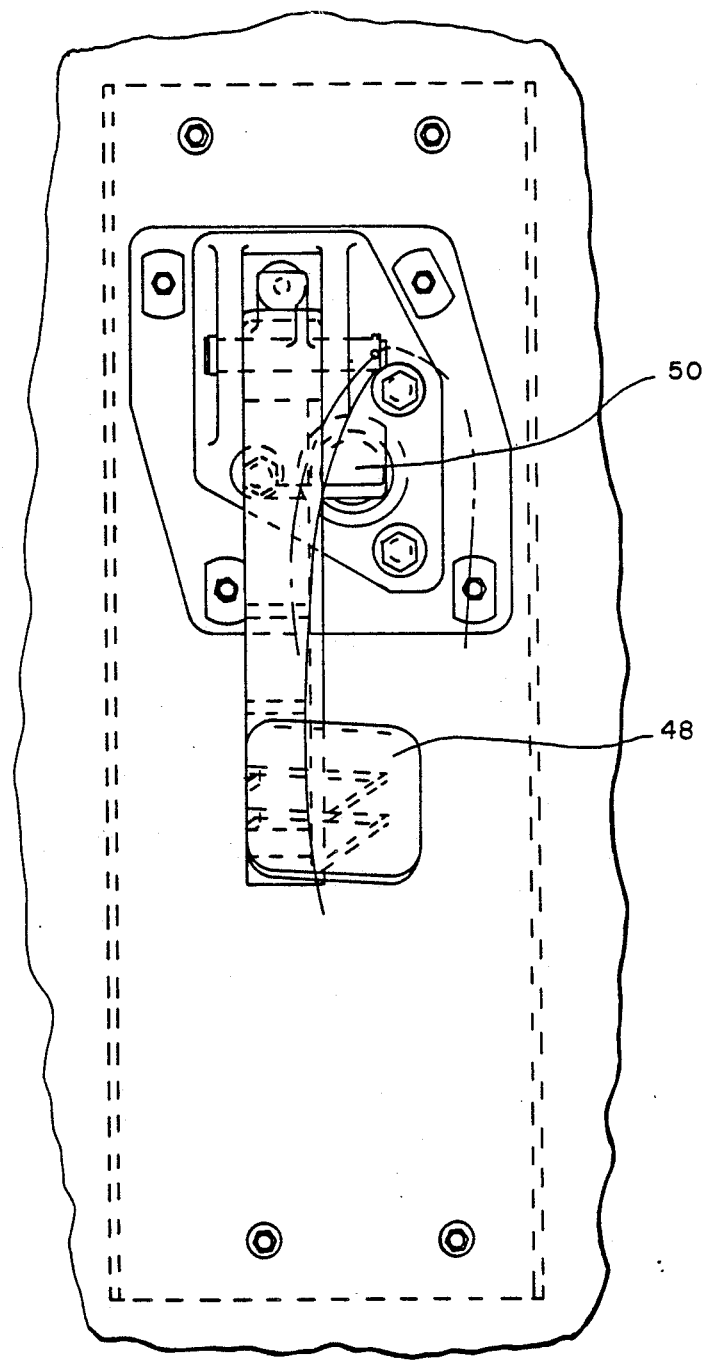
FIG. — 3

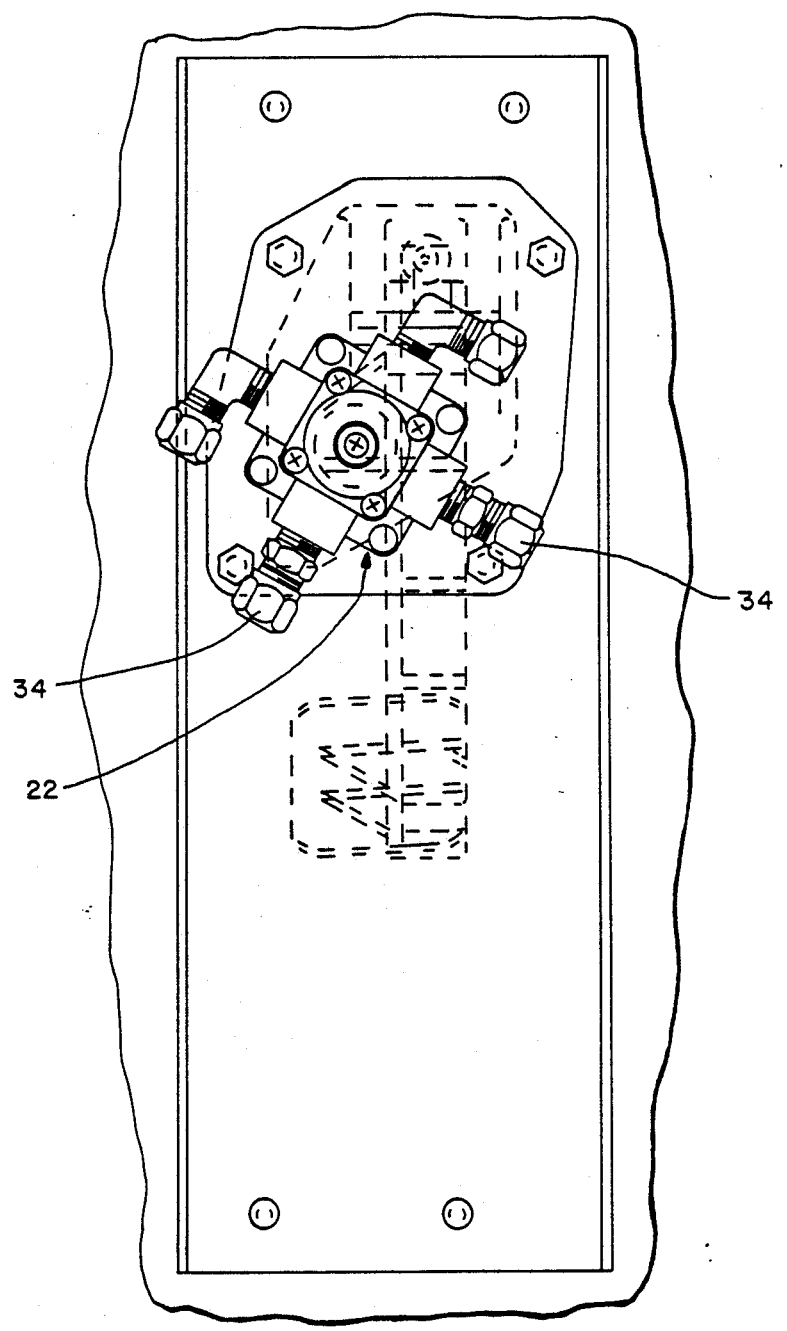
FIG.—4

FIREWALL MOUNTED FOOT VALVE AND BRAKE PEDAL ASSEMBLY

The present invention relates generally to trucks and more particularly to a foot valve and brake pedal assembly for use in a cab-over-engine (COE) type of truck.

Heavy duty trucks often use air operated brakes which are operated by the driver through a foot valve and brake pedal assembly. This assembly includes a foot valve mounted outside the truck for connecting the brake system to a pneumatic source through a series of hoses, and a brake pedal and plunger located within the truck cab's interior for actuation by the driver.

Serviceability of the typical foot valve and brake pedal assembly is difficult due to its location on most heavy duty trucks. To remove a foot valve from such a vehicle for repair or replacement requires that the air hoses first be removed from the foot valve from outside the cab, and then the foot valve assembly is removed, typically from inside the cab. In addition, on a COE vehicle, the cab itself must be tilted up for access to the hoses under the cab, but the cab should be tilted down for access to the fasteners which attach the foot valve to the vehicle.

In most cases heretofore, foot valve and brake pedal assemblies have been mounted to the floor of the cab with the foot valve on its exterior side, under the cab floor This location of the foot valve may subject it to contamination, either as a result of wheel splash from below or due to dirt and water from the driver's shoes on the floor inside the cab.

As will be seen in detail hereinafter, the present invention provides a foot valve and brake pedal assembly for use in a cab-over-engine type of truck and specifically an assembly which overcomes the disadvantages discussed above. More specifically, as will be disclosed in detail hereinafter, the foot valve and brake pedal assembly disclosed herein is especially suitable for use in a COE truck including a cab having a front firewall defining the forwardmost extent of the cab's interior near the driver's feet and a nose hood mounted for pivotal movement between a closed position in front of the firewall and an opened position for gaining access to the firewall externally of the cab.

In accordance with the present invention, the foot valve and brake assembly disclosed herein which include a foot and a brake pedal disengagably connected to the front firewall of the cab: (1) such that its brake pedal is located on the interior side of the firewall within the cab, (2) such that its foot valve is located on the exterior side of the firewall behind the nose hood when the latter is in its closed position, but easily accessible from outside the cab when the hood is in its opened position, and (3) such that the assembly including its foot valve and brake pedal can be manually disconnected and removed from the firewall as a single unit from outside the cab when the nose hood of the cab is in its opened position. In this way, the entire foot valve and brake assembly can be serviced from outside the truck's cab without tilting the cab and without having to pass the entire assembly through the interior of the cab, carrying grease and dirt with it and requiring that an operator be present in the cab. Moreover, by placing the foot valve on the exterior side of the vertical firewall, it is protected against contamination, either as a result of wheel splash from below or due to dirt and water from the driver's shoes.

These and other features of the present invention will be discussed in more detail hereinafter in conjunction with the drawings wherein:

FIG. 1 is a side elevational view of the cab of the COE truck having a foot valve and brake pedal assembly designed in accordance with the present invention;

FIG. 2A is an enlarged side elevational view illustrating the foot valve and brake pedal assembly mounted to a front firewall of the cab shown in FIG. 1;

FIG. 2B is a view similar to 2A more specifically illustrating the foot valve and brake pedal assembly disengaged from the firewall;

FIG. 3 is a rear elevational view of the foot valve and brake pedal assembly shown mounted to the firewall, as viewed from the interior of the cab and specifically showing the assembly's brake pedal; and FIG. 4 is a front elevational view of the foot valve and brake pedal assembly shown mounted to the firewall, as viewed from the exterior side of the cab and specifically illustrating the assembly's foot valve.

Turning now to the drawings, wherein like components are designated by like reference numerals throughout the various figures, attention is first directed to FIG. 1. This figure illustrates a cab 10 forming part of an overall cab-over-engine type of truck. Cab 10 which is located over the truck's engine (not shown) includes, among other components, a front windshield 12 and a front vertical firewall 14 located below the windshield and defining the forwardmost extent of the cab's lower interior 16, near the driver's feet. Cab 10 also includes a nose hood 18 which wraps around the cab's front face and sides and which is mounted at its top rearwardmost end for pivotal movement between a vertically extending closed position in front of firewall 14, as shown in solid lines, for preventing external access to the firewall, and a tilted-up opened position, shown in dotted lines, for gaining acces to the firewall from outside the cab.

Still referring to FIG. 1, the overall COE truck includes a foot valve and brake assembly 20 which is designed and mounted to firewall 14 in accordance with the present invention. More specifically, as will be seen hereinafter, assembly 20 includes, among other components, a foot valve 22 located on the exterior side of the firewall behind nose hood 18 when the latter is in its closed position, but easily accessible from outside the cab when the hood is in its opened position, and a brake pedal 24 located on the interior side of the firewall within the cab for actuation by the driver, as shown. In accordance with the present invention, foot valve 22 and brake pedal 24 and the rest of the components making up assembly are interconnected together and mounted to firewall 14 such that the assembly can be readily manually disconnected and removed from the firewall as a single assembly unit from outside cab 10 when nose hood 18 is in its opened position, without having to tilt entire cab and without ever having to enter the cab interior 16.

Turning to FIGS. 2–4 attention is now directed to the details of foot valve and brake pedal assembly 20. As seen best in FIG. 2B, the overall assembly is shown disconnected from firewall 14 and the channel plate 26 which is fixedly connected to the exterior side of the firewall. Note specifically at the outset that the firewall and channel plate 26 together define a common opening 28 for accommodating assembly 20 in its mounted position. The assembly itself includes a mounting plate 30 which supports foot valve 22 on its exterior side by means of bolts or other suitable fastening means generally indicated at 32. The foot valve, which by itself may be conventional and readily providable, uses a series of valve inlets and outlets generally indicated at 34, interconnecting the truck's brake system to a pneumatic source by means of a series of air hoses. For purposes of clarity, these air hoses have been omitted from the figures. While the foot valve is mounted to the exterior side of support plate 30, as stated, it does include an actuating plunger 36 which extends through a cooperating opening in the support plate so as to reside in a fixed location on its interior side, as best illustrated in FIGS. 2A and 3.

Overall brake pedal 24 is shown including a generally straight lever 38 having an upper end 40 pivotally connected by means of a pivot pin 42 to a flange arrangement 44 forming part of and extending outwardly from the interior side of support plate 30 above and laterally to one side of actuating plunger 36, as best seen in FIGS. 2A and 3. Lever 38 extends downward and inward into the cab's interior from the flange arrangement 44 and supports a foot pad 46 at its bottom. As shown best in FIG. 3, the foot pad includes a segment 48 extending laterally to one side of lever 38, in direct alignment with actuating plunger 36. At the same time, the lever includes a plunger actuating flange 50 which also extends laterally to one side of the lever directly over plunger 36. In this way, when the truck driver uses his foot to push down on the foot pad of the brake pedal, causing lever 38 to pivot downward, flange 50 engages plunger 36 to actuate foot valve 22 and the braking system.

In accordance with one feature of the present invention, foot pad segment 48 and flange 50 both line up with plunger 36 so that when the driver applies downward force to the foot pedal it does not subject the lever to any twisting forces. This is to be contrasted with the situation where plunger 36 must be located to one side of the lever while the foot pad remains in alignment with the lever, in its entirety. In that case, twisting forces are created between the actuating section of the lever (corresponding to flange 50) and the lever itself.

Overall foot valve and brake assembly 20 has been described apart from firewall 14 and channel plate 26. As illustrated in FIGS. 2A, 3 and 4, this overall assembly is disengagably connectable to the firewall 14 by suitable fastening means such as threaded bolts 50 which fasten support plate 30 to the exterior side of channel plate 26 over common opening 28 such that the brake pedal 24 and plunger 36 lie on the interior side of the firewall and foot valve 22 lies on the exterior side.

In accordance with a second and primary feature of the present invention, the entire foot valve and brake pedal assembly can be easily manually disconnected from the firewall from outside the cab by merely tilting up the nose hood 18 in the manner shown in FIG. 1. When the nose hood is in the up position, it is only necessary to disconnect the various air hoses from valve inlet and outlets 34 and remove bolts 50. Once this is done, as illustrated in FIG. 2B, the entire assembly, as a unit, can be separated from the firewall by pulling the foot pedal out of the cab's interior through common opening 28. Note that the person doing this does not ever have to be in the cab and the foot valve itself never has to pass through the interior of the cab. Also, note that the foot valve rests well above the bottom of the cab and is not likely to be contaminated by either wheel splash or by dirt and water from the driver's shoes. Still another feature of the present invention resides in the fact that the valve itself can be easily disengagably connected from the support plate 30 once the entire assembly is removed form the firewall. In this way, the foot valve can be more readily maintained.

We claim:

1. In a truck of the cab-over engine type including a cab which is located over the truck's engine and which has a front windshield, a front vertical firewall located below said windshield and defining the forwardmost extent of the cab's lower interior near the driver's feet, and a nose hood mounted for pivotal movement between a closed position in front of said firewall for preventing external access to the firewall and an opened position for gaining access to said firewall externally of said cab, the improvement comprising:

(a) a foot valve and brake pedal assembly including a foot valve, a brake pedal and means including a support plate for disengageably connecting the foot valve and brake pedal together in an operating condition, such that said foot valve is manually disengeable from said support plate and said brake pedal, and
    (b) means disengagabely connecting said support plate to said firewall such that
        (i) said brake pedal is located on the interior side of said firewall within the cab,
        (ii) said foot valve is located on the exterior side of said firewall behind the nose hood when the latter is in its closed position, but easily accessible from outside the cab when the hood is in its opened position, and
        (iii) said assembly including said foot valve, support plate and brake pedal are manually disconnectable and removable from said cab when said nose hood is in its opened position, whereby said foot valve is manually separable from said support plate after the entire brake assembly has been disconnected from the firewall.

2. The improvement according to claim 1 wherein said support plate includes a flanged member for pivotally supporting said brake pedal, and a main plate shaped member for detachable connection to said firewall and for supporting said foot valve.

3. The improvement according to claim 1 wherein said assembly includes a pin for pivotally supporting said brake pedal in a downwardly suspended manner from its top end.

4. The improvement according to claim 3 wherein said assembly includes an actuating plunger, and wherein said brake pedal includes a substantially straight lever connected at one end of said pivot pin and positioned laterally to one side of said plunger, said lever carrying a plunger actuating flange near its pivot connected end and extending laterally to one side of said lever directly over said plunger and said lever supporting a foot pad at its other end, said foot pad including a segment extending laterally to one side of said lever, said segment having a laterally most edge located laterally beyond a normal plane extending through the center of said plunger, whereby said foot pad is in direct alignment with said plunger and plunger actuation flange.

5. A foot valve and brake pedal assembly comprising:
    (a) a support plate;
    (b) a foot valve including an actuating plunger mounted to said support plate; and
    (c) a brake pedal including:

(i) a straight lever pivotally connected at one end thereof to said support plate and positioned laterally to one side of said plunger, (ii) a foot pad connected to the other end of said lever and including a segment thereof extending laterally to one side of said lever in direct alignment with said plunger, said segment having a laterally most edge located laterally beyond a normal plane extending through the center of said plunger, and (iii) a plunger actuating flange connected to said lever between its ends and extending to one side of said lever directly over said plunger, whereby to engage said plunger when said lever is pivoted about its pivot connected end.

6. An assembly according to claim 5 wherein said lever is pivotally connected at its top end and extends downward therefrom.

* * * * *